United States Patent
McIver

[11] 3,773,062
[45] Nov. 20, 1973

[54] FLOW DIVERTER VALVE
[75] Inventor: Donald J. McIver, Houston, Tex.
[73] Assignee: Keystone International Inc., Houston, Tex.
[22] Filed: Mar. 24, 1971
[21] Appl. No.: 127,504

[52] U.S. Cl.................. 137/1, 137/610, 251/298
[51] Int. Cl......... E03b 1/00, F17d 1/00, F16k 1/14
[58] Field of Search................ 137/625.44, 625.47, 137/612, 375, 1, 610; 251/309, 298

[56] References Cited
UNITED STATES PATENTS
| | | | |
|---|---|---|---|
| 3,206,163 | 9/1965 | Freed................................. | 251/309 |
| 3,498,315 | 3/1970 | Graves et al....................... | 137/375 |
| 3,552,426 | 1/1971 | Hester et al. ...................... | 137/375 |
| 3,236,496 | 2/1966 | Rosenstein et al.............. | 251/368 X |
| 3,384,421 | 5/1968 | Flatt............................ | 137/625.44 X |
| 2,651,051 | 9/1953 | Parks et al..................... | 137/625.44 |
| 3,545,470 | 12/1970 | Paton........................ | 137/625.44 X |
| 3,570,539 | 3/1971 | Herring......................... | 137/625.44 |
| 3,636,980 | 1/1972 | Maloney....................... | 137/625.44 |

Primary Examiner—Samuel Scott
Attorney—Ned L. Conley and Murray Robbinson

[57] ABSTRACT

A diverter valve includes a "wye" shaped conduit and a paddle pivotally mounted at the confluence of the branches of the conduit and adapted to seal across either branch to direct flow from the trunk of the conduit to one branch or the other. A replaceable sealing means is provided on the inner periphery of the conduit. The sealing means comprises a conical tube made of an elastomeric material.

9 Claims, 3 Drawing Figures

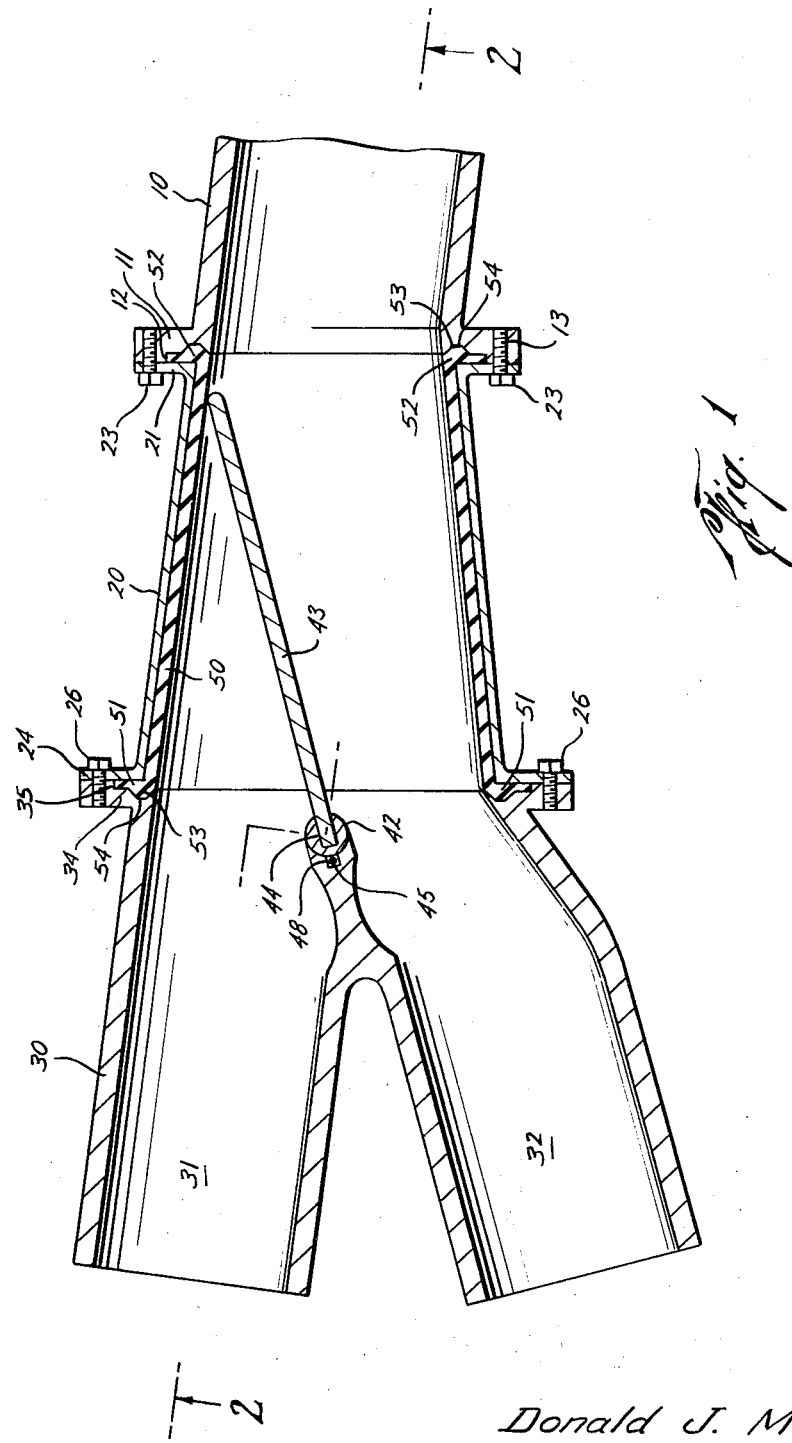

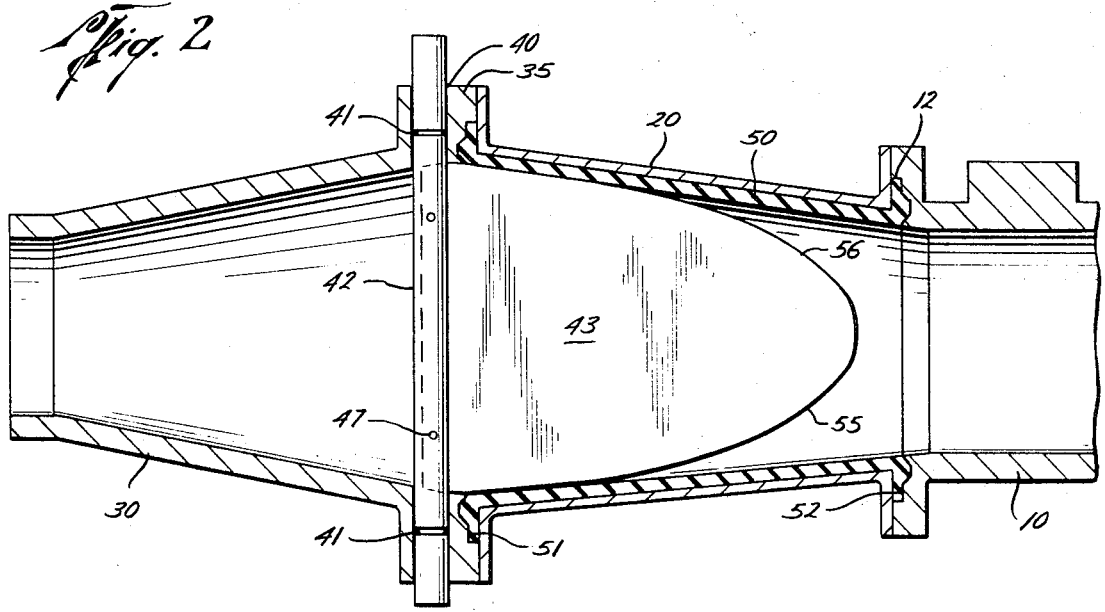
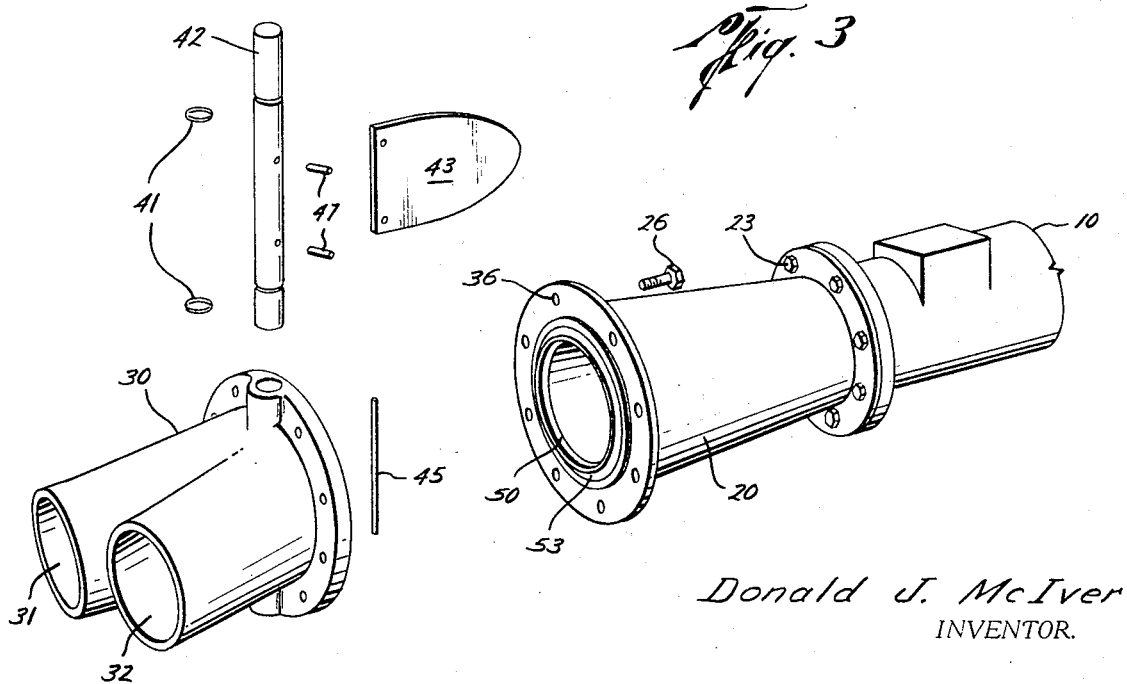
Donald J. McIver
INVENTOR.

FLOW DIVERTER VALVE

BACKGROUND OF THE INVENTION

1. Field of the Invention

This invention pertains to material flow control, and more particularly to a flow diverter valve having a replaceable sealing means.

2. Description of the Prior Art

In the movement of fluent materials, it is often desirable to switch the flow from one to another of a plurality of branch conduits. For this purpose, there is provided a diverter valve, having a trunk, two branches, and a diversion means to block off flow through a selected branch. Several types of diverter valves have been designed to divert the flow of material from one branch to the other. The means for diversion most generally used in a diverter valve is a "paddle", such as is shown and described in U.S. Pats. No. 3,472,317, No. 3,261,048, No. 3,139,932 and No. 1,708,380. The paddle of a diverter valve of this type is usually pivotally mounted at the confluence of the branches and is movable to alternately block one branch and allow passage through the other branch.

This type of a diverter valve is used in conveyer pipe apparatus in which material is transported through a conduit by means of a conveying fluid such as air. In such a conveyer the conveying medium moves particulate materials such as flour, cement, grain, and the like from one location to the other. In order to maintain pressure of the conveying fluid it is necessary to seal between the paddle and the inner periphery of the conduit of the diverter valve. Due to the flow of abrasive fluent materials extreme wear takes place on the seal requiring that it be frequently replaced.

Recent developments have been directed to an abrasion resistant diverter valve. The prior art in the field of diverter valves had generally been limited to a metal-to-metal contact between the paddle and the inner periphery of the conduit. Since metal-to-metal contact does not perfect a good sealing engagement, a seal has been designed such as is shown in a publication by *Systems Engineering and Manufacturing Company*, where an elastomeric sealing material is molded on the peripheral edge of the paddle to effectuate a good seal. The weakness of this design is that the seal is subject to excessive wear when abrasive material is passed through the flow diverter. With the sealing edge molded on the diversion paddle, the stream of air and product impinged upon the molded seal. When the diverter valve was handling abrasive products, the seal wore rapidly, lasting only two or three weeks. When the seal wore out, it was necessary to replace the entire diverter paddle. It would be difficult to provide a replaceable seal on the edge of a paddle because of its irregular shape, being a segment of an ellipse with one straight side and one curved side. If a replaceable seat and seal were placed on the inside of the cone section of the valve, at the juncture with the edge of the paddle, such seat and seal would protrude into the path of flow subjecting the seal to rapid abrasion.

SUMMARY OF THE INVENTION

According to the present invention, there is provided a diverter valve having a new and improved seal which is not only readily replaceable without replacement of the diverter paddle, but which also effects an improved sealing engagement and has a high resistance to fluent abrasive material. In accordance with the invention, there is provided a tubular, elastomeric, replaceable seal lining the entirety of the cone section of the diverter valve. The seal is inlaid in the inner surface of the diverter valve permitting a continuously smooth and uniform inner surface throughout the diverter valve thereby creating a regular surface with no protrusions into the flow passing through the diverter valve. The seal is retained in the cone section by means of external flanges. This construction increases the life of the seal to more than a year as compared to a few weeks for the seal molded on the paddle. Since the seal is conical in shape and disposed such that the fluent material flows toward the larger end of the seal, the abrasive contact between the fluent abrasive material and the surface of the seal is limited. By placing the seal in an annular recess on the inner periphery of the conduit, the fluent abrasive material no longer impinges on the sealing means as it had on the prior art seal which had been molded on the edge of the diverter paddle. According to the invention, the elliptical edge of the diverter paddle is caused to press into the conical seal such that a complete seal on the peripheral edge of the diversion paddle is effected around the internal periphery of the conduit.

BRIEF DESCRIPTION OF THE DRAWINGS

For a detailed description of a preferred embodiment of the invention, reference will now be made to the accompanying drawings wherein:

FIG. 1 is an axial section of a diverter valve embodying the invention taken at a plane perpendicular to the axis of the shaft;

FIG. 2 is an axial section of the diverter valve of FIG. 1 taken at a place parallel to the axis of the shaft; and FIG. 3 is an exploded isometric view of the apparatus shown in FIGS. 1 and 2.

The drawings are substantially to scale and therefore represent the preferred embodiment of the invention to true proportion.

DESCRIPTION OF THE PREFERRED EMBODIMENT

Reference now to the three figures, there is shown a trunk conduit 10, an intermediate conduit 20, and a "wye" conduit 30 which are respectively connected together end to end. These three parts together form the conduit constituting the body of the diverter valve. The trunk conduit 10 serves as the inlet for the flow of the fluent material into the diverter valve, and the "wye" conduit 30 serves as the outlet of the flow from the valve.

The trunk conduit 10 and the intermediate conduit 20 have mating radially extending annular flanges 11 and 21 having an equal peripheral diameter. An axially extending annular bead 12 is disposed on flange 11. The bead is coaxial with the intermediate conduit 20 and projects away from flange 11 upon which it is disposed. Bead 12 has a slightly larger inner diameter than the peripheral diameter of flange 52 of seal 50 hereinafter described. The flanges 11 and 21 are releasably connected by a series of screws 23, passing into tapped holes 13 in the flanges 11 and 21.

The "wye" conduit 30 is connected to the other end of the intermediate conduit 20 by mating radially extending annular flanges 24 and 34 having an equal peripheral diameter. An axially extending annular bead 35 is disposed on flange 34. The bead 35 is coaxial with the intermediate conduit 20 and projects away from flange 34 upon which it is disposed. Bead 35 has a slightly larger inner diameter than the peripheral diameter of flange 51 of seal 50 hereinafter described. The flanges 24 and 34 are releasably connected by a series of screws 26, passing into tapped holes 36 in the flanges 24 and 34.

The "wye" conduit 30 has two cylindrical branches 31 and 32 that meet and connect at a common opening forming a mouth 33 to which the intermediate conduit 20 is connected. Branches 31 and 32 serve as the alternative outlets for the material flow, and are connected to branch extension conduits (not shown).

Wye conduit 30 is provided with bore 40 located at the confluence of the two outlet branches 31 and 32. The axis of the bore 40 is perpendicular to the plane defined by the axes of the branches 31 and 32. The diversion means includes a shaft 42 rotatably mounted in the bore 40 and sealed to the wye conduit 30 by means of two O-rings 41. A diversion paddle 43 has the shape of a segment of an ellipse. The paddle is attached to the shaft 42 by means of an axial channel groove 44 in the shaft 42 which receives the straight side of the paddle, whereby the paddle has one edge parallel to the axis of shaft 42 and the other protruding into the intermediate conduit 20. In assembling the valve, seal 45 is placed in the groove 48. The paddle 43 is then inserted into the channel groove 44 and secured by means of groove pins 47. The "wye" conduit 30 is sealed to the shaft by seal 45. The shaft 42 protrudes from the bore 40 where either a hydraulic or manual rotation means is connected. This rotation means is utilized to rotate the diversion paddle 43 inside the intermediate conduit 20 to such a position as to block one of the branch outlets 31 or 32, thereby diverting the flow of the fluent material to the other outlet.

The sealing means embodying the invention comprises an annular resilient flexible seal 50 having an internal periphery in the shape of a truncated cone flaring from the inlet of the diverter valve to the outlet. The seal 50 lines the inner periphery of the intermediate conduit 20. The seal 50 is in the form of a sleeve, having a length that is greater than its diameter.

The inner surface of the intermediate conduit 20 creates a depression permitting the seal 50 to be inlaid in the diverter valve. This provides a flush and even inner surface throughout the valve creating a regular surface with no protrusions into the flow passing through said valve. Not only does this structure not obstruct the flow through the valve, but the seal 50 has no part extending into the flow of abrasive material to permit excessive wear.

The seal 50, having the shape of a truncated cone, and being positioned within the intermediate conduit 20 such that the largest diameter of the seal is at the outlet and the smallest is at the inlet, provides a configuration which limits the contact between the fluent material and the seal 50 since the flow moves toward the diverging sections of the seal. The structure so limits the material from impinging on the seal that its life has been greatly increased.

The seal 50 is affixed to the intermediate conduit 20 by means of radially extending annular flanges 51 and 52 on each end of the seal 50. An axially extending annular ridge 53 projecting from each face of the flanges 51 and 52 mates with an annular groove 54 disposed in the external face of flanges 11 and 34. The ridges 53 fit into the grooves 54, providing a seal for the connection between the trunk conduit 10 and the intermediate conduit 20 and for the connection between the wye conduit 30 and the intermediate conduit 20. The ridges 53 also align the seal 50 with the connecting conduits 10 and 30 to assure a continuously smooth and uniform transition between the inner surface of the seal 50 and the inner surface of the conduits 10 and 30 at the connections.

The seal 50 is fixed in position within the intermediate conduit 20 by the mating of ridges 53 and grooves 54, and then compressing flanges 11 and 21 and flanges 24 and 34 to connect the three conduits 10, 20 and 30 together. This configuration allows seal 50 to be replaced or inspected by merely removing the intermediate conduit 20.

The seal 50, by entirely lining the inner surface of the intermediate conduit 20, can seal with the diverter paddle 43 in either position. As the paddle 43 is positioned to block either branch outlet 31 or 32, an elliptical line is formed by the pressing of the peripheral edge 55 of the paddle 43 into the conical seal 50. The moving edge 55 is a segment of an ellipse which is adapted to press into the seal 50 causing the elastomeric material of the seal 50 to flow around the juncture 56 of the paddle 43 and the seal 50 thus permitting an excellent sealing engagement.

The seal 50 is made up of an elastomeric material with such properties that the seal 50 can be collapsed and expanded for insertion into and removal from the intermediate conduit 20. The minimum internal diameter of the intermediate conduit 20 is smaller than the outer diameter of the external flange 52 on the smaller diameter end of the seal 50 when in the unstressed condition. The seal 50 is collapsed and inserted into the intermediate conduit 20 and then allowed to expand into position such that the flanges 51 and 52 are inserted within beads 12 and 35 respectively. This structure allows the seal 50 to be easily replaced in the valve. Because the external surface of seal 50 is symmetric in shape, the seal 50 can be removed from the diverter valve and revolved and then inserted back into the intermediate conduit 20 such that the placement of the worn areas of the seal 50 are altered in relation to the contacting edge of the paddle 43.

The diverter valve may be made of many suitable materials. The body of the valve will normally be cast iron, aluminum or stainless steel, and preferably, is made of a corrosion and abrasion resistant material. The seal should be made of a material that allows some resilience so as to effect a seal when pressed by the peripheral edge of the diversion paddle. The material also must have such properties as to allow the seal to be collapsible and expandable for assembly and removal from the back-up sleeve. In general, polyurethane with a durometer hardness on the Shore A scale between fifty and seventy and with a thickness between one thirty-second of an inch to three-fourths of an inch has proven to have the most desirable properties for such a seal. However, the durometer hardness could be as low as 35 if the seal were molded from some elastomers such as natural rubber.

This invention provides an improved sealing engagement and a high resistance to abrasion by the flow of fluent abrasive material. While a preferred embodiment of the invention has been shown and described,

I claim:

1. A method of controlling the flow of abrasive fluent material comprising:
   providing a conduit in the shape of a cone having an opening at one end and a plurality of openings at the other end and a conical section between said ends,
   flowing said abrasive fluent material through said conduit in the direction in which said conical conduit flares,
   providing said conical conduit with an elastomeric seal lining the inner periphery of the conduit,
   blocking flow through said conduit from said smaller end to one of said openings at the larger end by disposing a diverter member in said conical conduit across the path for fluent material flow,
   pressing said diverter member against said seal and thereby indenting said seal and flowing said elastomeric material of said seal around the juncture of said diverter member in said seal thus perfecting the sealing engagement.

2. A diverter valve comprising:
   a trunk conduit,
   a "wye" conduit having a first branch and a second branch meeting and connecting at a common opening forming a mouth,
   an intermediate conduit having a first end and a second end, the second end having a smaller diameter than the first end,
   means for connecting one end of said trunk conduit to the second end of the intermediate conduit, and the mouth of said "wye" conduit to the first end of the said intermediate conduit,
   a paddle having a portion disposed in said intermediate conduit, said paddle being pivotally mounted at the confluence of the branches of the "wye" conduit for movement between a first position in which said paddle prevents flow from the trunk conduit to the first branch permitting flow through the second branch, and a second position in which the paddle prevents flow from the trunk conduit to the second branch permitting flow through the first branch,
   wherein the improvement comprises:
   a resilient sleeve disposed about the inner periphery of said intermediate conduit positioned to be engaged by said paddle in each of said first and second positions, said sleeve being in the shape of a truncated cone flaring from the second end to the first end of the intermediate conduit, and having radially extending annular flanges perpendicular to its axis disposed on the external periphery of its ends, and an axial annular protruding ridge on the external face of each flange whereby the ridges mate with corresponding grooves disposed on the connecting means between the conduits.

3. A diverter valve comprising:
   a trunk conduit,
   a "wye" conduit having a first branch and a second branch meeting and connecting at a common opening forming a mouth,
   an intermediate conduit having a first end and a second end, the second end having a smaller diameter than the first end,
   means for connecting one end of said trunk conduit to the second end of the intermediate conduit, and the mouth of said "wye" conduit to the first end of the said intermediate conduit,
   a paddle having a portion in the form of a segment of an ellipse disposed in said intermediate conduit, said paddle having pivotally mounted at the confluence of the branches of the "wye" conduit for movement between a first position in which said paddle prevents flow from the trunk conduit to the first branch permitting flow through the second branch, and a second position in which the paddle prevents flow from the trunk conduit to the second branch permitting flow through the first branch,
   wherein the improvement comprises:
   a resilient sleeve disposed about the inner periphery of only said intermediate conduit positioned to be engaged by the elliptical portion of said paddle in each of said first and second positions, whereby the sleeve is deformed to form a seal between it and the paddle.

4. A valve as set forth in claim 3 wherein said sleeve has a first end and a second end, said first end adjoining the connecting end of the trunk conduit and both having a common inner diameter, said second end adjoining the mouth of the "wye" conduit and both having a common inner diameter, whereby said sleeve forms a flush and even inner surface throughout said valve thereby creating a regular surface with no protrusions into the flow passing through said valve.

5. A valve as set forth in claim 3 wherein the sleeve is composed of an elastomeric material with a durometer hardness on the Shore A scale between 35 and 70.

6. A valve as set forth in claim 3 wherein said connecting means includes an external radially extending annular flange disposed on each end of said intermediate conduit, an external radially extending annular flange disposed on the connecting end of the trunk conduit, an external radially extending annular flange disposed on the mouth of the "wye" conduit, and correlative annular alignment means on said seal to align said conduits.

7. A valve as set forth in claim 3 wherein said sleeve is symmetrical about its longitudinal axis whereby said sleeve can be revolved about the inner periphery of the conduit thereby altering the positions of the worn portions of the sleeve in relation to the paddle.

8. A valve as set forth in claim 3 wherein the internal periphery of the sleeve has the shape of a truncated cone flaring from the second end to the first end of the intermediate conduit.

9. A valve as set forth in claim 8 wherein the conical sleeve has radially extending annular flanges perpendicular to the axis of the sleeve disposed on the external periphery of the ends of the sleeve.

* * * * *